(12) United States Patent
Tsuda et al.

(10) Patent No.: US 10,414,403 B2
(45) Date of Patent: Sep. 17, 2019

(54) CONTROL DEVICE

(71) Applicant: AISIN AW CO., LTD., Anjo-shi, Aichi-ken (JP)

(72) Inventors: Kohei Tsuda, Nishio (JP); Shoichi Ishida, Toyoake (JP); Norihiro Muto, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 118 days.

(21) Appl. No.: 15/742,450

(22) PCT Filed: Sep. 8, 2016

(86) PCT No.: PCT/JP2016/076515
§ 371 (c)(1),
(2) Date: Jan. 5, 2018

(87) PCT Pub. No.: WO2017/043602
PCT Pub. Date: Mar. 16, 2017

(65) Prior Publication Data
US 2018/0194355 A1    Jul. 12, 2018

(30) Foreign Application Priority Data

Sep. 10, 2015 (JP) ................................ 2015-178638

(51) Int. Cl.
*B60W 30/19* (2012.01)
*B60K 6/48* (2007.10)
(Continued)

(52) U.S. Cl.
CPC .............. *B60W 30/19* (2013.01); *B60K 6/48* (2013.01); *B60K 6/547* (2013.01); *B60W 10/02* (2013.01); *B60W 10/06* (2013.01); *B60W 10/10* (2013.01); *B60W 20/00* (2013.01); *B60W 30/188* (2013.01); *F02D 29/00* (2013.01); *F02D 41/023* (2013.01); *B60W 2510/0241* (2013.01); *B60W 2510/0638* (2013.01); *B60W 2510/1005* (2013.01); *B60W 2510/1015* (2013.01);
(Continued)

(58) Field of Classification Search
CPC ............................ B60W 30/19; B60K 6/547
See application file for complete search history.

(56) References Cited

U.S. PATENT DOCUMENTS 5,846,163 A    12/1998 Kimura et al.
5,951,614 A    9/1999 Tabata et al.
(Continued)

FOREIGN PATENT DOCUMENTS

JP    H07-117529 A    5/1995
JP    H09-264412 A    10/1997
(Continued)

OTHER PUBLICATIONS

Nov. 15, 2016 International Search Report issued in International Patent Application No. PCT/JP2016/076515.

*Primary Examiner* — Derek D Knight
(74) *Attorney, Agent, or Firm* — Oliff PLC (57) ABSTRACT

A control device that controls a vehicle drive device in which an input member, an engagement device, a shift input member, a transmission device, and an output member are disposed in this order on a power transmission path connecting an internal combustion engine and wheels, the control device includes an electronic control unit.

2 Claims, 7 Drawing Sheets

(51) Int. Cl.
    *B60K 6/547*     (2007.10)
    *B60W 10/02*     (2006.01)
    *B60W 10/06*     (2006.01)
    *B60W 20/00*     (2016.01)
    *F02D 29/00*     (2006.01)
    *B60W 10/10*     (2012.01)
    *B60W 30/188*     (2012.01)
    *F02D 41/02*     (2006.01)

(52) U.S. Cl.
    CPC ............... *B60W 2510/1095* (2013.01); *B60W 2710/021* (2013.01); *B60W 2710/025* (2013.01); *B60W 2710/0666* (2013.01); *B60W 2710/10* (2013.01); *F02D 2200/101* (2013.01); *F02D 2200/1002* (2013.01); *F02D 2250/18* (2013.01)

(56) References Cited

U.S. PATENT DOCUMENTS

| | | | | |
|---|---|---|---|---|
| 7,644,790 B2 * | 1/2010 | Roske | .................... | B60K 6/387 180/65.22 |
| 2008/0070745 A1 * | 3/2008 | Ogata | ...................... | B60K 6/48 477/15 |
| 2017/0327122 A1 * | 11/2017 | Ishida | ...................... | B60K 6/48 |

FOREIGN PATENT DOCUMENTS

| | | |
|---|---|---|
| JP | H09-331602 A | 12/1997 |
| JP | 2004-218785 A | 8/2004 |
| JP | 2006-177424 A | 7/2006 |

\* cited by examiner

CONTROL DEVICE

BACKGROUND

The present disclosure relates to a control device that controls a vehicle drive device.

There has been used a vehicle drive device that includes an engagement device and a transmission device on a power transmission path connecting an internal combustion engine and wheels. This type of vehicle drive device is disclosed, for example, in Japanese Patent Application Publication No. 9-331602 (JP 9-331602 A). In the vehicle drive device of JP 9-331602 A, the state of engagement of an engagement device disposed between an internal combustion engine and a transmission device is set to either an engaged state or a disengaged state in accordance with the drive mode. In other words, when implementing a drive mode in which the engagement device is brought into the engaged state to drive the vehicle using the internal combustion engine as a driving force source, the engagement device is maintained in the engaged state.

In the case of performing control for causing an engagement device disposed between an internal combustion engine and a transmission device to slip during a shift operation of the transmission device to achieve an intended purpose, an excessive increase (so-called "racing") in the rotational speed of the internal combustion engine may occur due to variations in the transfer torque of the engagement device or the like. However, the vehicle drive device of JP 9-331602 A is not designed for a situation in which the engagement device is caused to slip during a shift operation, and hence there is no risk of racing of the internal combustion engine. Accordingly, there has been no opportunity to discuss the technique for preventing such a phenomenon.

SUMMARY

An exemplary aspect of the disclosure provides a technique for preventing an internal combustion engine from racing even when performing control for causing an engagement device disposed between the internal combustion engine and a transmission device to slip during a shift operation.

According to the present disclosure, there is provided a control device that controls a vehicle drive device in which an input member, an engagement device, a shift input member, a transmission device, and an output member are disposed in this order on a power transmission path connecting an internal combustion engine and wheels. The control device includes an electronic control unit that is configured to execute in-shift slip control that causes the engagement device to slip during a power-on upshift which performs switching to a shift speed with a relatively low speed ratio while torque in a forward acceleration direction is transferred to the wheels; execute inertia phase torque down control that reduces output torque of the internal combustion engine during an inertia phase in the power-on upshift; and when a determination is made that a rotational speed of the input member is higher than or equal to a reference rotational speed which is set to a value greater than a rotational speed of the shift input member during execution of the in-shift slip control, execute special torque down control that reduces the output torque of the internal combustion engine in a first period from a time point after start of slip of the engagement device to start of the inertia phase.

According to this configuration, even when the torque of the internal combustion engine for accelerating the wheels in the forward direction is transferred to the wheels in the inertia phase during a shift operation (power-on upshift), it is possible to make the shift operation progress appropriately, by executing inertia phase torque down control to reduce the rotational speed of the shift input member. Furthermore, during execution of control for causing the engagement device disposed between the internal combustion engine and the transmission device to slip, it is possible to detect that racing of the internal combustion engine is beginning to occur based on the magnitude relationship between the rotational speed of the input member and the reference rotational speed higher than the rotational speed of the shift input member. If it is detected that racing is beginning to occur, special torque down control is executed to reduce the output torque of the internal combustion engine, thereby preventing a further increase in the rotational speed of the internal combustion engine. Accordingly, it is possible to prevent the internal combustion engine from racing, even when performing control for causing the engagement device disposed between the internal combustion engine and the transmission device to slip during a shift operation. In particular, it is possible to prevent the internal combustion engine from racing before the start of the inertia phase, by performing special torque down control, separately from the inertia phase torque down control, in the first period before the start of the inertia phase in the power-on upshift.

Further features and advantages of the technique of the present disclosure will become more readily apparent from the following description of illustrative, non-limiting embodiments when taken in conjunction with the accompanying drawings.

DETAILED DESCRIPTION OF EMBODIMENTS

An embodiment of a control device will be described. A control device 1 is a control device for a vehicle drive device, and controls a vehicle drive device 3. The vehicle drive device 3 controlled by the control device 1 is a drive device for driving a vehicle that includes at least an internal combustion engine EG as a driving force source for wheels W. In the present embodiment, the vehicle drive device 3 (hybrid vehicle drive device) for driving a vehicle (hybrid vehicle) that includes both the internal combustion engine EG and a rotary electric machine 33 as driving force sources for the wheels W will be described by way of example. The vehicle drive device 3 is configured as a parallel hybrid vehicle drive device for driving a parallel type hybrid vehicle.

In the following description, the term "drivingly coupled" refers to a state in which two rotary elements are coupled to allow transmission of a driving force (synonym for torque). The concept includes a state in which the two rotary elements are coupled to rotate together, and a state in which the two rotary elements are coupled via one or more transmission members to allow transmission of a driving force. Examples of such transmission members include various types of members that transmit rotation at the same speed or a changed speed (such as a shaft, a gear mechanism, and a belt), and may include engagement devices that selectively transmit rotation and a driving force (such as a friction engagement device and a meshing-type engagement device).

Furthermore, the term "rotary electric machine" refers to any of a motor (electric motor), a generator (electric generator), and a motor generator that serves as both a motor and a generator as necessary.

As for the state of engagement of a friction engagement device, an "engaged state" indicates a state in which a transfer torque capacity is produced in the friction engagement device. The transfer torque capacity refers to the maximum torque that can be transferred by friction. The magnitude of the transfer torque capacity is proportional to the pressure (engagement pressure) at which paired engagement members (an input-side engagement member and an output-side engagement member) of the friction engagement device are pushed against each other. The "engaged state" includes a "direct-coupling engaged state" in which there is no difference in rotational speed (slip) between the paired engagement members, and a "slip engaged state" in which there is a difference in rotational speed between the engagement members. The "disengaged state" indicates a state in which no transfer torque capacity is produced in the friction engagement device.

Figure 1:
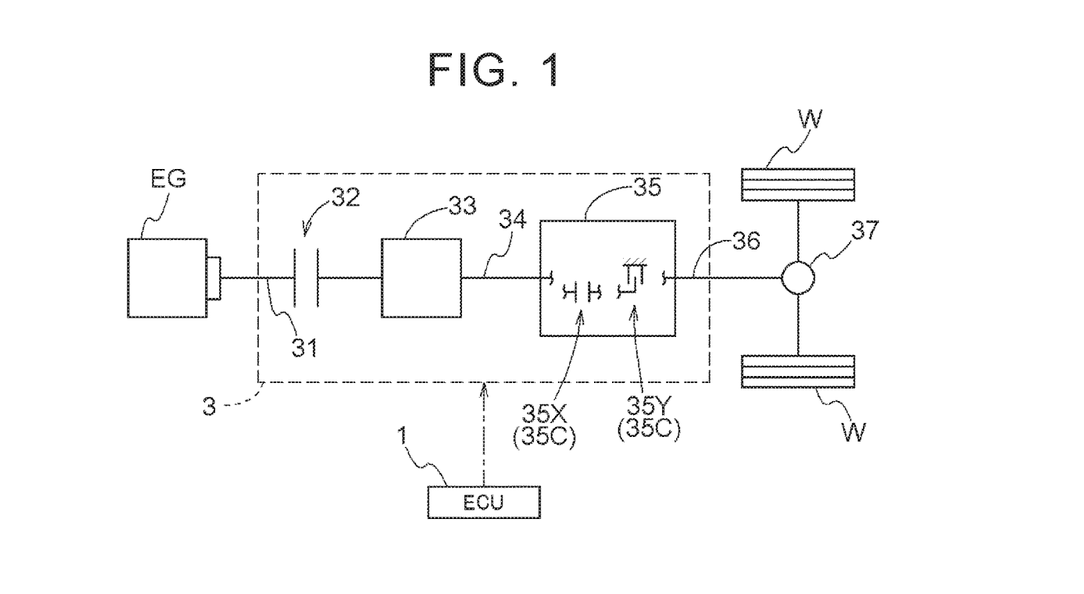
FIG. 1 is a schematic view illustrating a vehicle drive device according to an embodiment.

As illustrated in FIG. 1, the vehicle drive device 3 includes a decoupling engagement device 32 and a transmission device 35, on a power transmission path connecting the internal combustion engine EG and the wheels W. In the present embodiment, the vehicle drive device 3 further includes the rotary electric machine 33. In order to transmit rotation and a driving force between the components on the power transmission path, the vehicle drive device 3 further includes an input member 31, a shift input member 34, and an output member 36. The input member 31, the decoupling engagement device 32, the rotary electric machine 33, the shift input member 34, the transmission device 35, and the output member 36 are disposed on the power transmission path in this order from the internal combustion engine EG side.

The input member 31 is drivingly coupled to the internal combustion engine EG The internal combustion engine EG is a motor (such as a gasoline engine and a diesel engine) that is driven by combustion of fuel inside the engine so as to output power. The input member 31 includes, for example, a shaft member (input shaft). The input member 31 is drivingly coupled to an internal combustion engine output member (such as a crank shaft) serving as an output member of the internal combustion engine EG to rotate therewith. Accordingly, the rotational speed of the input member 31 is the same as the rotational speed of the internal combustion engine EG In the following description, the rotational speed of the input member 31 may be indicated by algebra "Neg".

Note that the input member 31 and the internal combustion engine output member may be directly coupled, or may be coupled via another member such as a damper. The input member 31 is drivingly coupled to the rotary electric machine 33 via the decoupling engagement device 32.

The decoupling engagement device 32 selectively couples the input member 31 and the rotary electric machine 33. In other words, the decoupling engagement device 32 is capable of decoupling the internal combustion engine EG and the rotary electric machine 33. The decoupling engagement device 32 serves as an internal combustion engine decoupling engagement device that decouples the internal combustion engine EG from the wheels W. In the present embodiment, the decoupling engagement device 32 is a friction engagement device, which may be, for example, a wet multi-plate clutch. In the present embodiment, the decoupling engagement device 32 corresponds to an "engagement device".

The rotary electric machine 33 includes a stator fixed to a case, which is a non-rotary member, and a rotor rotatably supported on the radially inner side of the stator. The rotary electric machine 33 is connected to an electricity storage device via an inverter device. The rotary electric machine 33 is supplied with electricity from the electricity storage device to perform power running, or supplies electricity generated using torque of the internal combustion engine EG, an inertial force of the vehicle, or the like to the electricity storage device to store the electricity therein. The rotor of the rotary electric machine 33 is coupled to the shift input member 34 to rotate therewith. Accordingly, a rotational speed Nin of the shift input member 34 is the same as the rotational speed of the rotary electric machine 33 (rotor). The shift input member 34 includes, for example, a shaft member (shift input shaft). The shift input member 34 that rotates with the rotor is drivingly coupled to the transmission device 35.

In the present embodiment, the transmission device 35 is configured as a stepped automatic transmission device. The transmission device 35 of the present embodiment includes, for example, a planetary gear mechanism (not illustrated) and a plurality of shift engagement devices 35C. The shift engagement devices 35C include one or more clutches 35X and one or more brakes 35Y. In the present embodiment, the clutch 35X and the brake 35Y included in the shift engagement devices 35C are friction engagement devices. For example, the clutch 35X and the brake 35Y may be a wet multi-plate clutch and a wet multi-plate brake, respectively. Note that the shift engagement devices 35C may include one or more one-way clutches.

The transmission device 35 can selectively establish one of a plurality of shift speeds, in accordance with the state of engagement of each shift engagement device 35C. For example, the transmission device 35 selectively brings two of the plurality of shift engagement devices 35C into the direct-coupling engaged state, thereby establishing a shift speed corresponding to the combination of the engaged shift engagement devices 35C. The transmission device 35 changes the rotational speed Nin of the shift input member 34 based on a speed ratio corresponding to the established shift speed, and then transmits the changed rotational speed Nin to the output member 36. Note that a "speed ratio" refers to a ratio of the rotational speed Nin of the shift input member 34 to the rotational speed of the output member 36, and is calculated as a value obtained by dividing the rotational speed Nin of the shift input member 34 by the rotational speed of the output member 36. The output member 36 includes, for example, a shaft member (output shaft).

The output member 36 is drivingly coupled to the two right and left wheels W via a differential gear device 37. The torque transferred to the output member 36 is distributed and transferred to the two right and left wheels W via the differential gear device 37. The vehicle drive device 3 can thus transfer the torque of one or both of the internal combustion engine EG and the rotary electric machine 33 to the wheels W to drive the vehicle.

Figure 2:
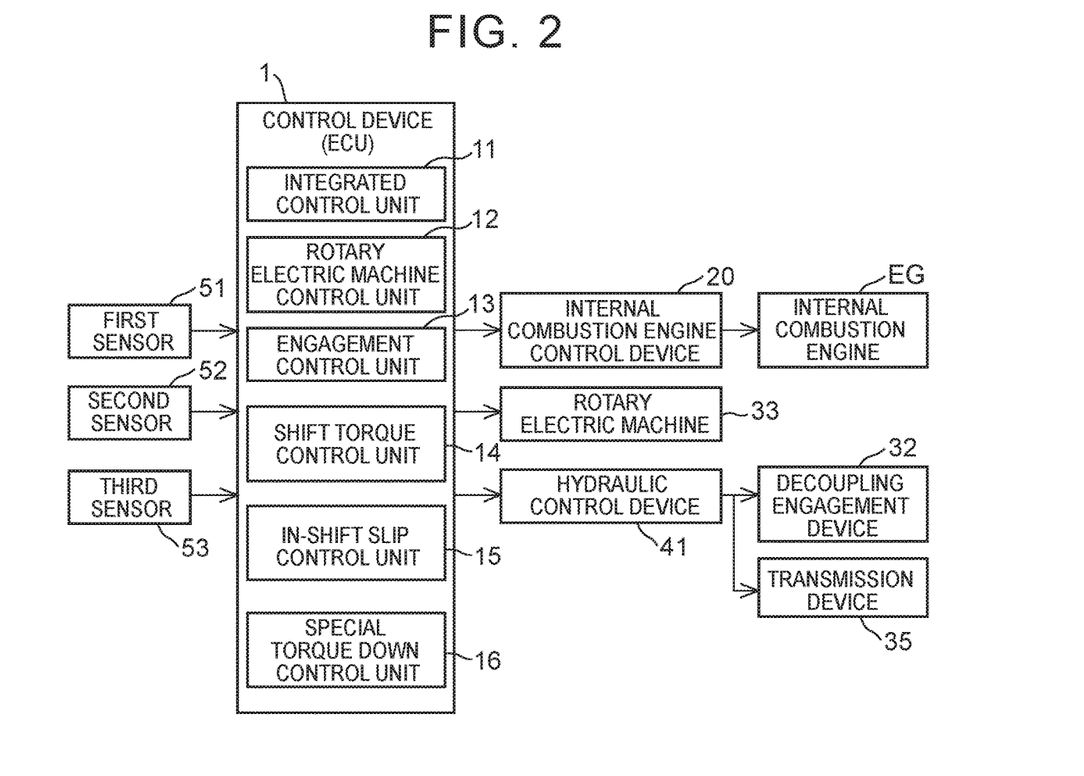
FIG. 2 is a block diagram illustrating the general configuration of a control device.

A control device 1 (Electronic Control Unit; ECU) functions as a core unit for controlling the operation of the components of the vehicle drive device 3. As illustrated in FIG. 2, the control device 1 includes an integrated control unit 11, a rotary electric machine control unit 12, an engagement control unit 13, a shift torque control unit 14, an in-shift slip control unit 15, and a special torque down control unit 16. These functional units are implemented by software (program) stored in a storage unit such as a memory, hardware such as a separately provided arithmetic circuit, or a combination of both. The functional units are configured to be capable of exchanging information with each other. Furthermore, the control device 1 is configured to be capable of acquiring information on the detection results of various sensors (a first sensor 51 to a third sensor 53) provided at different locations on the vehicle on which the vehicle drive device 3 is mounted.

The first sensor 51 detects a rotational speed of the input member 31 and a member (for example, the internal combustion engine EG) that rotates with the input member 31. The second sensor 52 detects the rotational speed of the shift input member 34 and a member (for example, the rotary electric machine 33) that rotates with the shift input member 34. The third sensor 53 detects the rotational speed of the output member 36, or the rotational speed of a member (for example, the wheels W) that rotates synchronously with the output member 36. The term "synchronously rotate" refers to rotating at a rotational speed proportional to a reference rotational speed. The control device 1 can calculate the vehicle speed based on the detection result of the third sensor 53. The control device 1 may be configured to be capable of acquiring information other than that described above, such as, for example, the accelerator operation amount, brake operation amount, and the amount of electricity stored in the electricity storage device.

The integrated control unit 11 performs control for integrating, over the entire vehicle, various types of control (such as torque control, rotational speed control, engagement control) that are performed on the internal combustion engine EG, the rotary electric machine 33, the decoupling engagement device 32, the transmission device 35 (shift engagement devices 35C), and so on. The integrated control unit 11 calculates the required vehicle torque that is required for driving the vehicle (wheels W), based on the sensor detection information (mainly, information on the accelerator operation amount and the vehicle speed).

The integrated control unit 11 determines the drive mode, based on the sensor detection information (mainly, information on the accelerator operation amount, the vehicle speed, and the amount of electricity stored in the electricity storage device). In the present embodiment, the travel mode that can be selected by the integrated control unit 11 includes an electric drive mode and a hybrid drive mode. The electric drive mode is a drive mode in which only the torque of the rotary electric machine 33 is transferred to the wheels W to drive the vehicle. The hybrid drive mode is a drive mode in which the torque of both the internal combustion engine EG and the rotary electric machine 33 is transferred to the wheels W to drive the vehicle.

The integrated control unit 11 determines the torque that the internal combustion engine EG is required to output (required internal combustion engine torque) and the torque that the rotary electric machine 33 is required to output (required rotary electric machine torque), based on the determined drive mode and the sensor detection information. The integrated control unit 11 determines the state of engagement of the decoupling engagement device 32, the target shift speed to be established by the transmission device 35, and so on, based on the determined drive mode and the sensor detection information.

In the present embodiment, the control device 1 (integrated control unit 11) controls the operation point (output torque and rotational speed) of the internal combustion engine EG, via an internal combustion engine control device 20. The internal combustion engine control device 20 can switch between torque control and rotational speed control of the internal combustion engine EG in accordance with the travel state of the vehicle. In the torque control of the internal combustion engine EG, a command for the target torque is provided to the internal combustion engine EG to make the output torque of the internal combustion engine EG follow the target torque. In the rotational speed control of the internal combustion engine EG, a command for the target rotational speed is provided to the internal combustion engine EG to determine the output torque such that the rotational speed of the internal combustion engine EG follows the target rotational speed.

The rotary electric machine control unit 12 controls the operating point (output torque and rotational speed) of the rotary electric machine 33. The rotary electric machine control unit 12 can switch between torque control and rotational speed control of the rotary electric machine 33 in accordance with the travel state of the vehicle. In the torque control of the rotary electric machine 33, a command for the target torque is provided to the rotary electric machine 33 to make the output torque of the rotary electric machine 33 follow the target torque. In the rotational speed control of the rotary electric machine 33, a command for the target rotational speed is provided to the rotary electric machine 33 to determine the output torque such that the rotational speed of the rotary electric machine 33 follows the target rotational speed.

The engagement control unit 13 controls the state of engagement of the decoupling engagement device 32, and the state of engagement of the plurality of shift engagement devices 35C included in the transmission device 35. In the present embodiment, the decoupling engagement device 32 and the plurality of shift engagement devices 35C are hydraulically-driven friction engagement devices. The engagement control unit 13 controls, via a hydraulic control device 41, the hydraulic pressure supplied to the decoupling engagement device 32 and each shift engagement device 35C, thereby controlling the state of engagement of the decoupling engagement device 32 and each shift engagement device 35C.

The engagement pressure of each engagement device changes in proportion to the magnitude of the hydraulic pressure supplied to the engagement device. Accordingly, the magnitude of the transfer torque capacity generated in each engagement device changes in proportion to the magnitude of the hydraulic pressure supplied to the engagement device. The state of engagement of each engagement device is controlled to be one of the direct-coupling engaged state, the slip engaged state, and the disengaged state, in accordance with the supplied pressure. The hydraulic control device 41 includes a hydraulic control valve (such as a linear solenoid valve) for adjusting the hydraulic pressure of the hydraulic oil supplied from an oil pump (not illustrated). Examples of the oil pump include, for example, a mechanical oil pump driven by the input member 31 or the shift input member 34, and an electric oil pump driven by a pump rotary electric machine. The hydraulic control device 41 regulates the opening of the hydraulic control valve in accordance with a hydraulic pressure command from the engagement control unit 13, thereby supplying hydraulic oil at a hydraulic pressure corresponding to the hydraulic pressure command to each engagement device.

The engagement control unit 13 controls the state of engagement of the decoupling engagement device 32 to establish the drive mode determined by the integrated control unit 11. For example, when establishing the electric drive mode, the engagement control unit 13 performs control to bring the decoupling engagement device 32 into the disengaged state. When establishing the hybrid drive mode, the engagement control unit 13 performs control to bring the decoupling engagement device 32 into the direct-coupling engaged state.

The engagement control unit 13 further controls the state of engagement of each of the plurality of shift engagement devices 35C to establish the target shift speed determined by the integrated control unit 11. The engagement control unit 13 performs control to bring two shift engagement devices 35C corresponding to the target shift speed into the direct-coupling engaged state, and performs control to bring all of the other shift engagement devices 35C into the disengaged state. Furthermore, in the case where the target shift speed is changed while the vehicle is travelling, the engagement control unit 13 performs control to switch specific shift engagement devices 35C from the direct-coupling engaged state to the disengaged state, and performs control to switch other specific shift engagement devices 35C from the disengaged state to the engaged state, based on the difference in which of the shift engagement devices 35C needs to be brought into the direct-coupling engaged state before and after the target shift speed is changed. In the following description, the shift engagement device 35C that is newly brought into the disengaged state during a shift operation is referred to as a "disengagement-side engagement device 35R", and the shift engagement device 35C that is newly brought into the engaged state (engaged) is referred to as an "engagement-side engagement device 35A".

In the shift control executed in response to a change in target shift speed during travel in the hybrid drive mode, the shift torque control unit 14 executes shift torque control for controlling the output torque of the internal combustion engine EG In the present embodiment, in a power-on shift which is a shift operation executed while the torque in a forward acceleration direction (at least the torque of the internal combustion engine EG) is transferred to the wheels W, the shift torque control unit 14 executes shift torque control.

The shift torque control is control of the output torque of the internal combustion engine EG for making a shift operation progress by changing the rotational speed Nin of the shift input member 34. In the present embodiment, the shift torque control unit 14 executes different types of shift torque control in accordance with the direction of change in target shift speed, that is, in accordance with whether the shift operation is a power-on upshift or a power-on downshift. A power-on upshift is a shift operation that performs switching from a shift speed with a relatively high speed ratio to a shift speed with a relatively low speed ratio while the torque in the forward acceleration direction is transferred to the wheels W. A power-on downshift is a shift operation that performs switching from a shift speed with a relatively low speed ratio to a shift speed with a relatively high speed ratio while the torque in the forward acceleration direction is transferred to the wheels W.

In the case where the shift operation is a power-on upshift, in an inertia phase Pi after a torque phase Pt, the rotational speed Nin of the shift input member 34 needs to be reduced from a pre-shift synchronous rotational speed Nsynb to a post-shift synchronous rotational speed Nsyna. That is, in the inertia phase Pi, the rotational speed Nin of the shift input member 34 needs to be reduced while the torque of the internal combustion engine EG in a positive direction is transmitted to the wheels W so as to accelerate the wheels W in the forward direction.

Note that the torque phase Pt is a period in which, during a shift operation, the torque assignment ratio between the disengagement-side engagement device 35R and the engagement-side engagement device 35A is changed to implement a state change from a state in which the disengagement-side engagement device 35R transfers wheel transfer torque to a state in which the engagement-side engagement device 35A transfers wheel transfer torque. The inertia phase Pi is a period in which the actual speed ratio in the transmission device 35 is changed from the speed ratio of the shift speed before the change to the speed ratio of the shift speed after the change, during a shift operation. In other words, the inertia phase Pi is a period in which the rotational speed Nin of the shift input member 34 corresponding to the rotational speed of the output member 36 is changed from the pre-shift synchronous rotational speed Nsynb to the post-shift synchronous rotational speed Nsyna.

The pre-shift synchronous rotational speed Nsynb is the rotational speed Nin of the shift input member 34 at the shift speed before start of a shift operation (that is, the shift speed before the change). The pre-shift synchronous rotational speed Nsynb can be calculated by multiplying the rotational speed of the output member 36 by the speed ratio of the shift speed before the change. The post-shift synchronous rotational speed Nsyna is the rotational speed Nin of the shift input member 34 at the shift speed after completion of a shift operation (that is, the shift speed after the change). The post-shift synchronous rotational speed Nsyna can be calculated by multiplying the rotational speed of the output member 36 by the speed ratio of the shift speed after the change.

Figure 3:
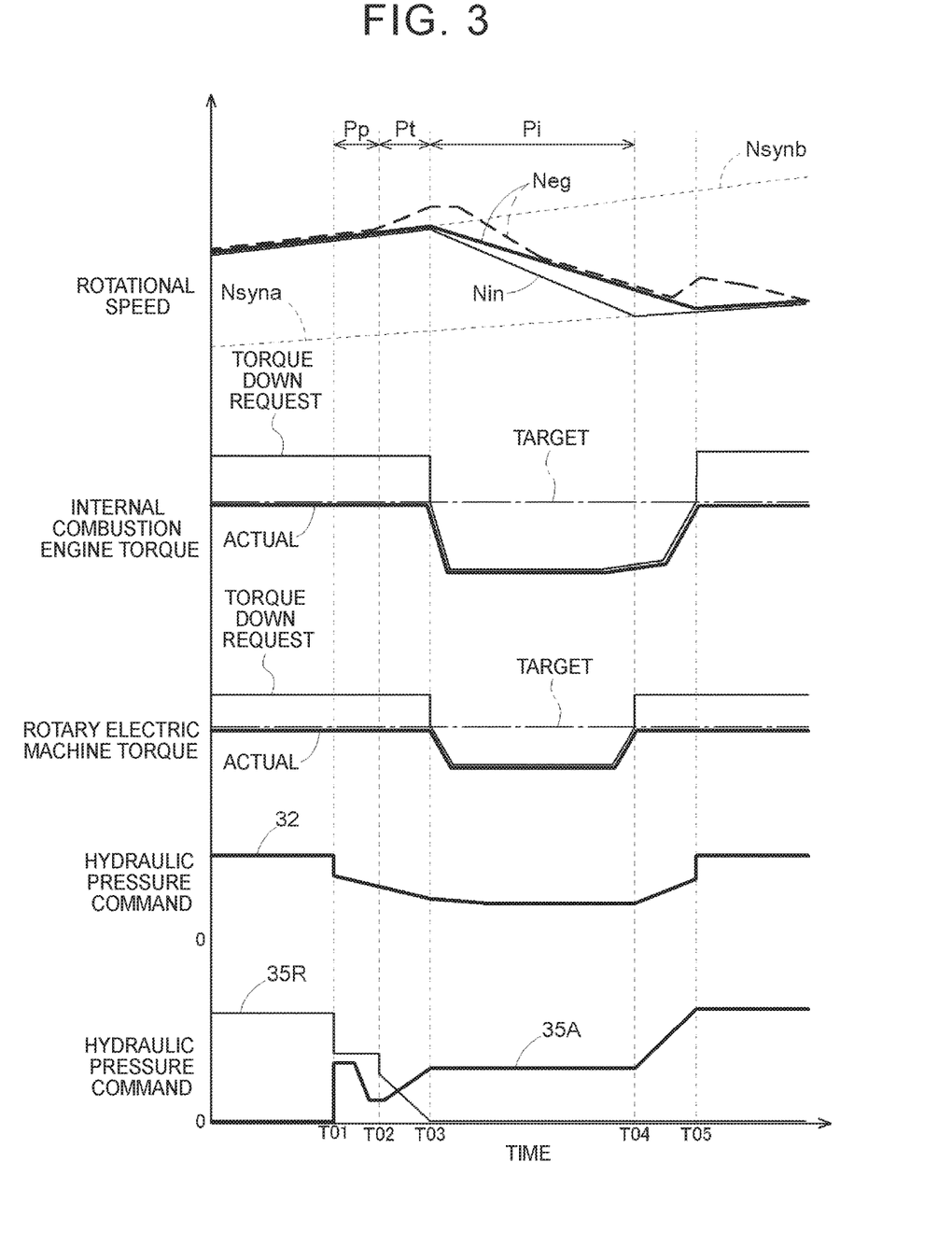
FIG. 3 is a timing chart illustrating a basic mode of in-shift slip control.

Accordingly, when the shift operation is a power-on upshift, as illustrated, for example, in FIG. 3, in the inertia phase Pi, the shift torque control unit 14 executes as shift torque control, normal torque down control for reducing the output torque of the internal combustion engine EG In the normal torque down control, the shift torque control unit 14 causes the internal combustion engine EG to output a torque smaller than a target torque of the internal combustion engine EG that is determined, for example, based on the required internal combustion engine torque. The normal torque down control is preferably executed by, for example, control for reducing the throttle opening of the internal combustion engine EG, or control for retarding the ignition timing of the internal combustion engine EG In the present embodiment, the normal torque down control corresponds to "inertia phase torque down control".

In the case where the shift operation is a power-on downshift, in the inertia phase Pi, the rotational speed Nin of the shift input member 34 needs to be increased from the pre-shift synchronous rotational speed Nsynb to the post-shift synchronous rotational speed Nsyna. The increase in the rotational speed Nin of the shift input member 34 can be promoted using the torque of the internal combustion engine EG in the positive direction for accelerating the wheels W in the forward direction. Accordingly, in the case where the shift operation is a power-on downshift, the shift torque control unit 14 gradually increases the target torque of the internal combustion engine EG in accordance with the required internal combustion engine torque, and gradually increases the output torque of the internal combustion engine EG in accordance therewith.

The control device 1 (in-shift slip control unit 15) executes, as one characteristic control operation of the present embodiment, in-shift slip control for causing the decoupling engagement device 32 to slip during a shift operation of the transmission device 35. The overview of the in-shift slip control executed mainly by the in-shift slip control unit 15 will first be described as a "basic mode" below with reference to FIG. 3. In the following description of the basic mode, a brief description will be given of the case where the shift operation is a power-on upshift.

<Basic Mode>

In the example of FIG. 3, when a power-on upshift request is received at time T01, a pre-phase Pp starts. In the pre-phase Pp, a hydraulic pressure command for the disengagement-side engagement device 35R is reduced stepwise from a full engagement pressure to a predetermined value greater than or equal to a direct-coupling limit engagement pressure. A hydraulic pressure command for the engagement-side engagement device 35A is increased to a predetermined pre-charge pressure, so that pre-charge of hydraulic oil is performed. Note that the full engagement pressure is the maximum engagement pressure (or may be a supply hydraulic pressure or a hydraulic pressure command corresponding thereto) that is set to maintain the direct-coupling engaged state even if the torque transferred to each engagement device varies. The direct-coupling limit engagement pressure is an engagement pressure at which each engagement device in the direct-coupling engaged state starts to slip (or may be a supply hydraulic pressure or a hydraulic pressure command corresponding thereto). The pre-charge pressure is set to, for example, a pressure lower than or equal to a stroke end pressure which is a supply hydraulic pressure or a hydraulic pressure command at the time when each engagement device in the disengaged state starts to have a transfer torque capacity.

After that, in the torque phase Pt from time T02 to T03, the hydraulic pressure command for the disengagement-side engagement device 35R is gradually reduced to the stroke end pressure (for example, zero). The hydraulic pressure command for the engagement-side engagement device 35A is gradually increased to a value corresponding to the required vehicle torque. Thus, the torque assignment ratio is changed. During a period from time T01 to T03 of the pre-phase Pp and the torque phase Pt, a hydraulic pressure command for the decoupling engagement device 32 is reduced stepwise from an initial full engagement pressure to a predetermined value greater than or equal to a direct-coupling limit engagement pressure at time T01, and then is reduced with a constant time rate of change. Thus, the decoupling engagement device 32 eventually starts to slip.

After that, at least in the inertia phase Pi from time T03 to T04, normal torque down control (an example of shift torque control) of the internal combustion engine EG is executed while the hydraulic pressure command for the decoupling engagement device 32 and the hydraulic pressure command for the engagement-side engagement device 35A are maintained substantially constant. In the present embodiment, in the inertia phase Pi, torque down operation for the rotary electric machine 33 (control for reducing the output torque of the rotary electric machine 33 in order to make the shift operation proceed by changing the rotational speed Nin of the shift input member 34) is also executed. The torque down control of the rotary electric machine 33 is preferably executed by reducing the positive rotation torque or applying the negative rotation torque (regenerative braking torque). Thus, the rotational speed Nin of the shift input member 34 is reduced from the pre-shift synchronous rotational speed Nsynb to the post-shift synchronous rotational speed Nsyna.

In the present embodiment, torque down control of the rotary electric machine 33 is executed only in the inertia phase Pi from time T03 to T04. Meanwhile, normal torque down control of the internal combustion engine EG is executed also in the period from time T04 to T05 after the inertia phase Pi. The period from time T04 to T05 is a period for bringing the decoupling engagement device 32 in the direct-coupling engagement state again by gradually reducing, over time, the difference in rotational speed between opposing engagement members of the decoupling engagement device 32 having been slipping during the shift operation. In this period, the hydraulic pressure command for the decoupling engagement device 32 is increased gradually, and then increased stepwise to the full engagement pressure. Meanwhile, the hydraulic pressure command for the engagement-side engagement device 35A is increased gradually to the full engagement pressure.

By executing such in-shift slip control, it is possible to decouple the inertia system of the internal combustion engine EG from the inertia system of the shift input member 34. Accordingly, due to the decoupled inertia system of the internal combustion engine EG, the inertia torque for changing the rotational speed Nin of the shift input member 34 at the time of completion of switching between shift speeds can be reduced. Accordingly, it is possible to reduce the torque difference generated upon completion of the shift operation, and hence reduce the shock at the end of shifting. Note that the decoupling engagement device 32 is caused to slip from the start of the inertia phase Pi to reduce the shock at the end of shifting. This is because, compared to the case where the decoupling engagement device 32 is caused to slip at the end of the inertia phase Pi, the desired purpose can be achieved with simple control.

There are some individual differences among decoupling engagement devices 32. Therefore, even when the same hydraulic pressure command is issued, it is inevitable that the actual transfer torque varies to some extent among the decoupling engagement devices 32. Accordingly, it is sometimes the case that, as indicated by the bold broken line in FIG. 3, for example, the actual transfer torque of the decoupling engagement device 32 falls below the target transfer torque, so that a rotational speed Nmg of the input member 31 rotating with the internal combustion engine EG increases excessively (so-called "racing" occurs). In power-on upshift, such racing of the internal combustion engine EG may occur at least before or after the inertia phase Pi.

Thus, the control device 1 (special torque down control unit 16) executes, as another characteristic control operation of the present embodiment, special torque down control for reducing the output torque of the internal combustion engine EG, separately from the shift torque control, under a certain condition, during execution of in-shift slip control. Similar to the normal torque down control, the special torque down control is preferably executed by, for example, control for reducing the throttle opening of the internal combustion engine EG, or control for retarding the ignition timing of the internal combustion engine EG The special torque down control is executed when a determination is made that the rotational speed Neg of the input member 31 is higher than or equal to a reference rotational speed Ns which is set to a value greater than the rotational speed Nin of the shift input member 34 during execution of in-shift slip control. The following describes, with reference to FIGS. 4 to 7, first and second control examples of in-shift slip control that includes special torque down control and that are executed mainly by the in-shift slip control unit 15 and the special torque down control unit 16. In the following, features similar to those of the above basic mode will not be specifically described.

<First Control Example>

Figure 4:
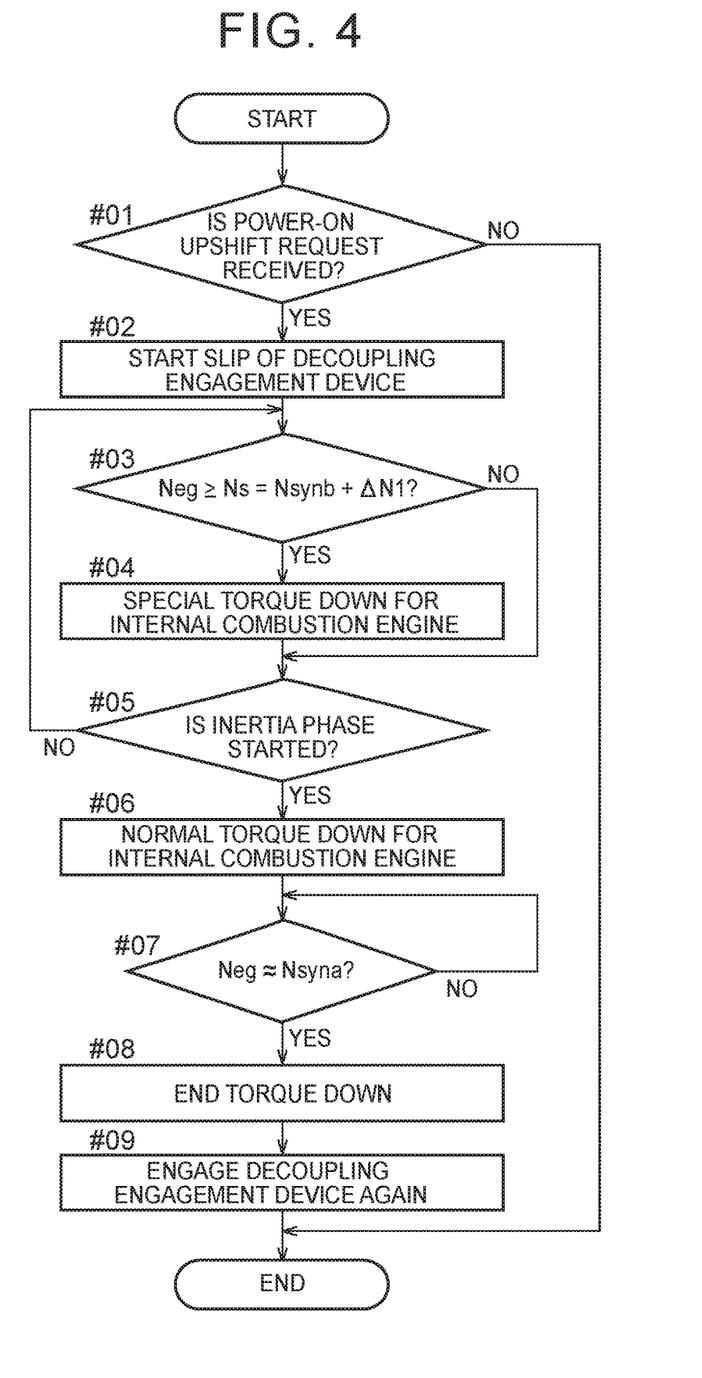
FIG. 4 is a flowchart illustrating the procedure of a first control example of in-shift slip control.
Figure 5:
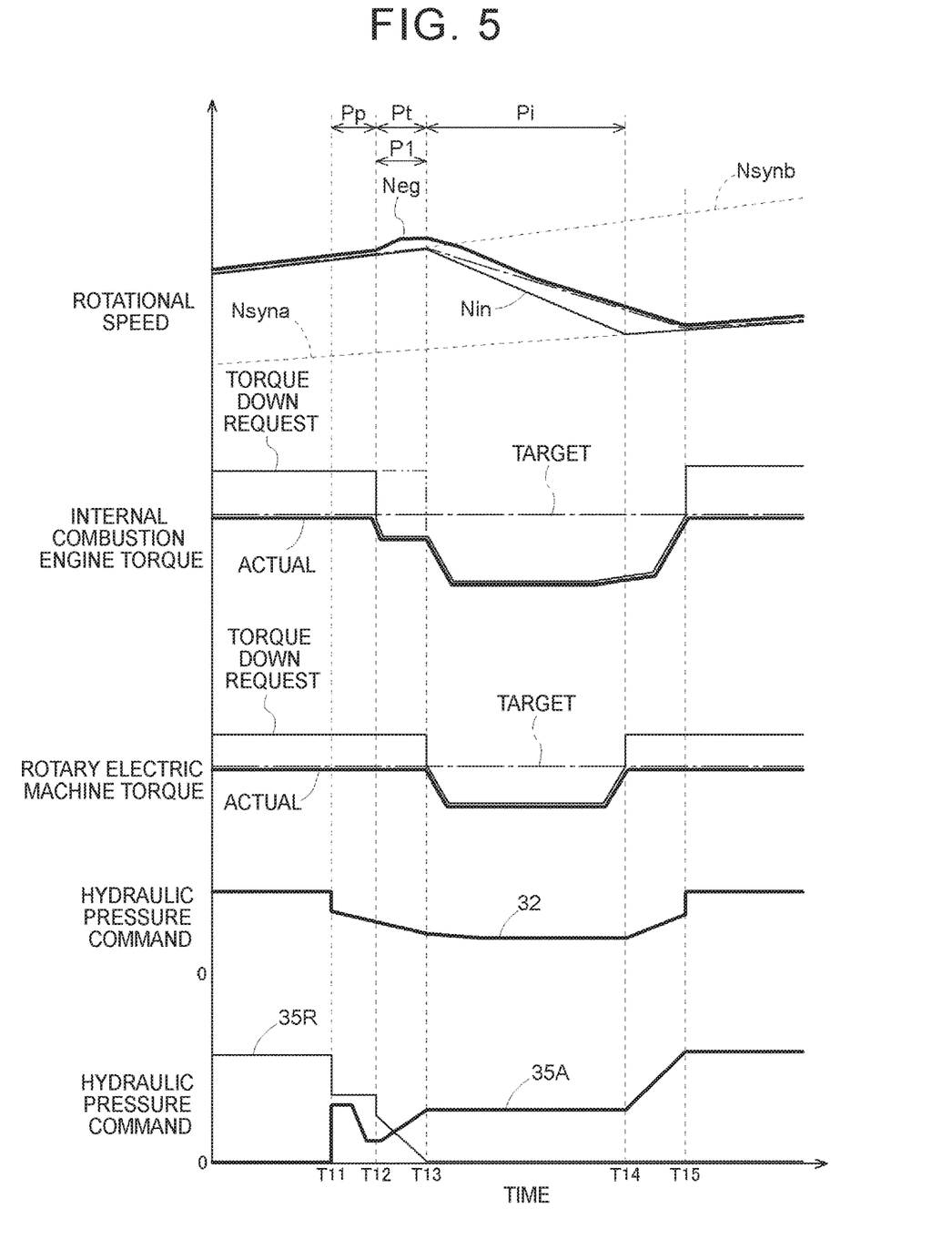
FIG. 5 is a timing chart illustrating an example of the first control example of in-shift slip control.

FIGS. 4 and 5 illustrate the first example of in-shift slip control. This control example is an example of in-shift slip control that is executed during a power-on upshift, more specifically a control example in which torque down is executed before the start of the inertia phase Pi as well. In the in-shift slip control including torque down control before changing the rotational speed during the power-on upshift, when a power-on upshift request is received (step #01: Yes, time T11), slip control of the decoupling engagement device 32 starts (#02). That is, the hydraulic pressure command for the decoupling engagement device 32 is reduced stepwise from a full engagement pressure to a predetermined value greater than or equal to a direct-coupling limit engagement pressure (T11), and then is reduced with a constant time rate of change (T11 to T13). Note that, in parallel with the slip control of the decoupling engagement device 32, normal shift control is executed, so that the pre-phase Pp (T11 to T12) and the torque phase Pt (T12 to T13) proceed.

After the slip control of the decoupling engagement device 32 starts, monitoring is performed to determine whether the rotational speed Neg of the input member 31 is higher than or equal to the reference rotational speed Ns which is set to a value greater than the rotational speed Nin of the shift input member 34 (#03). In this control example, the reference rotational speed Ns is set to a rotational speed higher than the rotational speed Nin of the shift input member 34 by a first differential rotational speed ΔN1. Since the rotational speed Nin of the shift input member 34 before the start of the inertia phase Pi is the pre-shift synchronous rotational speed Nsynb, the reference rotational speed Ns in this control example is set to the rotational speed higher than the pre-shift synchronous rotational speed Nsynb by the first differential rotational speed ΔN1. The pre-shift synchronous rotational speed Nsynb is determined in proportion to the rotational speed of the output member 36 before the start of the inertia phase Pi (more specifically, by multiplying by the speed ratio of the shift speed before shifting). The first differential rotational speed ΔN1 is determined in advance in view of a margin for accurately determining whether racing of the internal combustion engine EG is beginning to occur, and may be appropriately set in a range of, for example, 20 to 200 (rpm).

If the rotational speed Neg of the input member 31 is determined to be higher than or equal to the rotational speed higher than the pre-shift synchronous rotational speed Nsynb by the first differential rotational speed ΔN1 (#03: Yes, T12), special torque down control of the internal combustion engine EG is executed (#04). In the present embodiment, in a first period P1 (T12 to T13) from a time point after the start of slip of the decoupling engagement device 32 to the start of the inertia phase Pi (#05: Yes), special torque down control of the internal combustion engine EG is executed. Note that the special torque down control of the internal combustion engine EG is different from normal torque down control of the internal combustion engine EG (#06, T13 to T14) that is executed in the subsequent inertia phase Pi. The special torque down control of the internal combustion engine EG is different from the normal torque down control of the internal combustion engine EG at least in the timing of execution. In the present embodiment, the special torque down control of the internal combustion engine EG is different from the normal torque down control of the internal combustion engine EG also in the amount of torque reduced. The amount of torque reduced in the special torque control is less than the amount of torque reduced in the normal torque down control.

In the present embodiment, by executing the special torque down control (torque down control before changing the rotational speed during a power-on upshift), it is possible to prevent a further increase in the rotational speed of the internal combustion engine EG before the start of the inertia phase Pi, even in the case where the decoupling engagement device 32 is caused to slip during a shift operation. Accordingly, it is possible to prevent the internal combustion engine EG from racing before the start of the inertia phase Pi, while reducing the shock at the end of shifting by causing the decoupling engagement device 32 to slip during a shift operation. Note that if the inertia phase Pi is started without the rotational speed Neg of the input member 31 becoming higher than or equal to the rotational speed higher than the pre-shift synchronous rotational speed Nsynb by the first differential rotational speed ΔN1 (#03: No, #05: Yes), normal torque down control is executed without executing special torque down control of the internal combustion engine EG In the inertia phase Pi, the rotational speed Neg of the input member 31 gradually decreases with a time rate of change less than the time rate of change of the rotational speed Nin of the shift input member 34. The rotational speed Neg of the input member 31 gradually decreases after the inertia phase Pi as well. In this case, the rotational speed Neg of the input member 31 may be reduced by executing rotational speed control of the decoupling engagement device 32 to make the actual rotational speed difference between paired engagement members of the decoupling engagement device 32 follow the target differential rotational speed that gradually decreases over time, for example. When the rotational speed Neg of the input member 31 gradually decreases and is synchronized with the post-shift synchronous rotational speed Nsyna (#07: Yes, T15), the normal torque down control of the internal combustion engine EG ends (#08). Subsequently, the decoupling engagement device 32 is brought into the direct-coupling engaged state again (#09). Thus, the in-shift slip control ends.

<Second Control Example>

Figure 6:
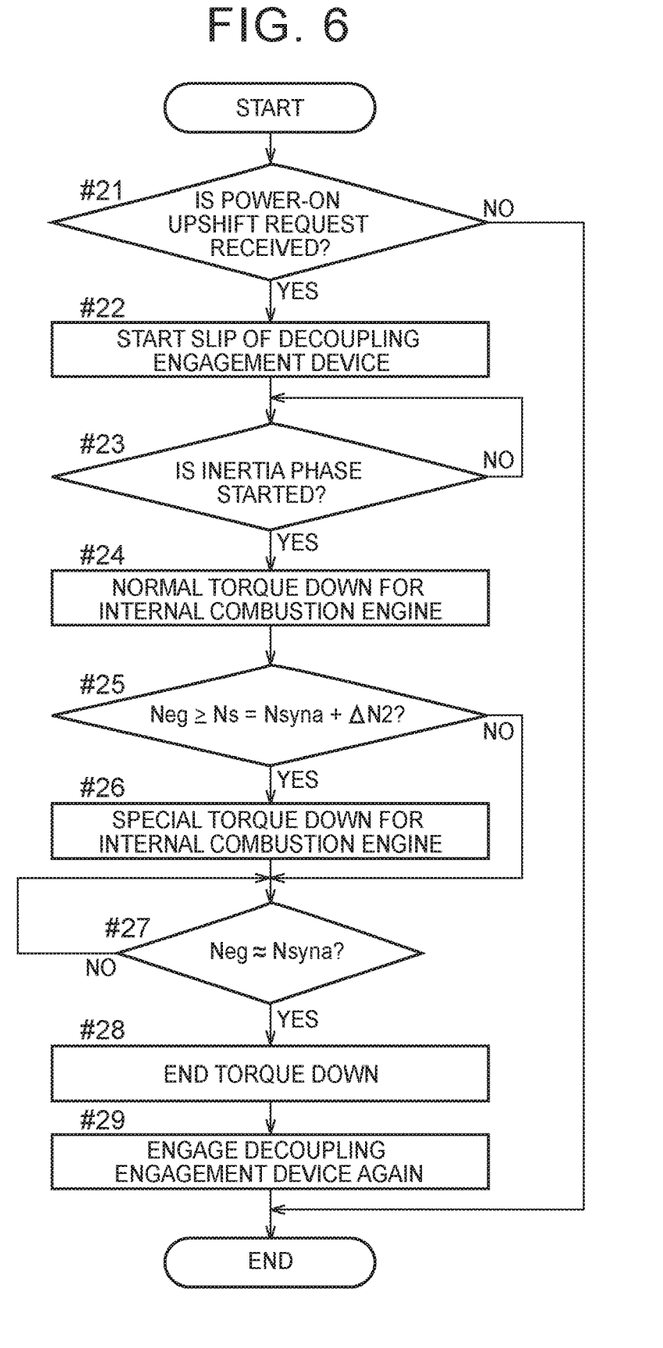
FIG. 6 is a flowchart illustrating the procedure of a second control example of in-shift slip control.
Figure 7:
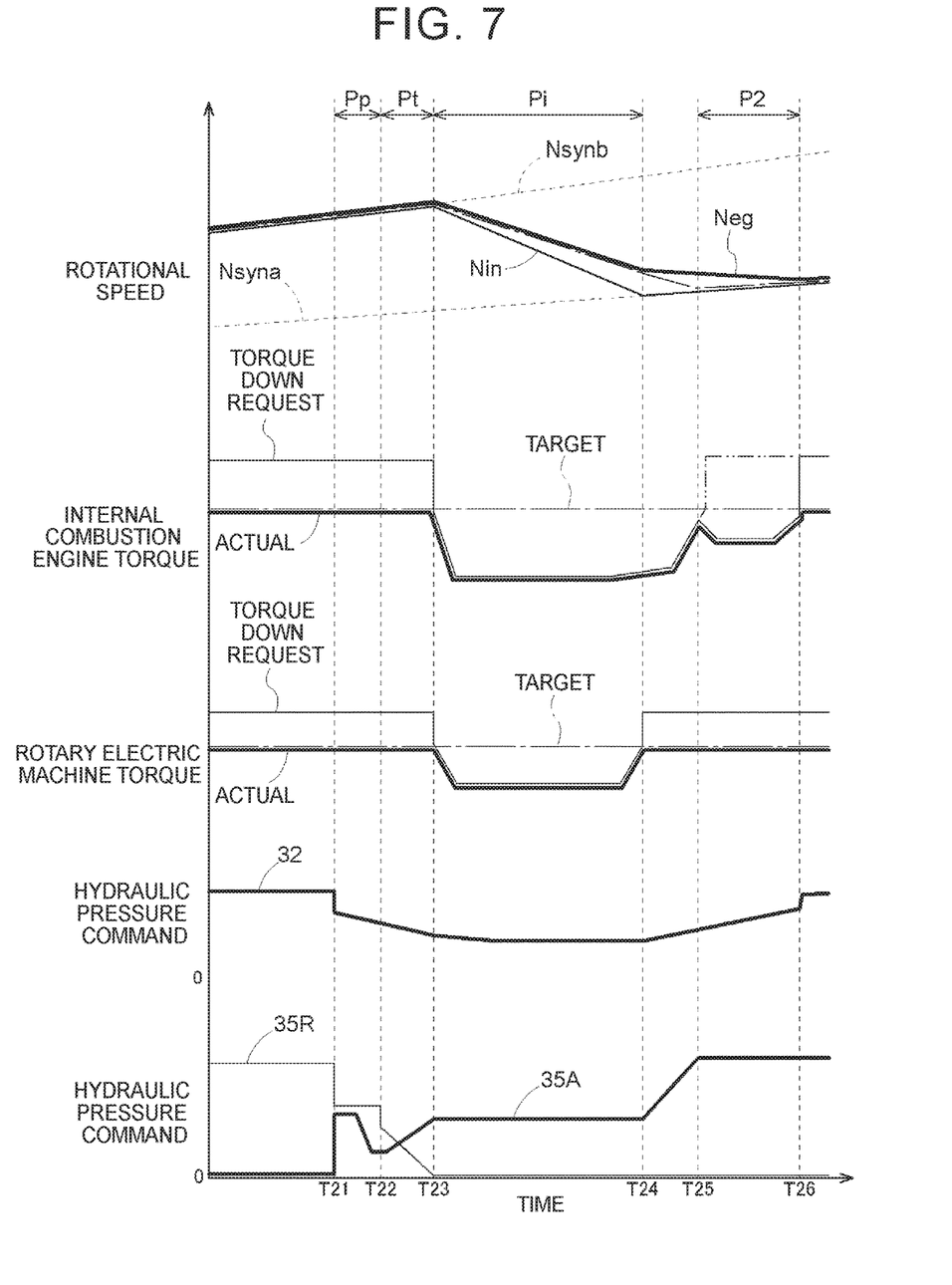
FIG. 7 is a timing chart illustrating an example of the second control example of in-shift slip control.

FIGS. 6 and 7 illustrate the second example of in-shift slip control. This control example is an example of in-shift slip control that is executed during a power-on upshift, more specifically a control example in which torque down is executed after the end of the inertia phase Pi as well. In the in-shift slip control including torque down control after changing the rotational speed during a power-on upshift, when a power-on upshift request is received (step #21: Yes, time T21), slip control of the decoupling engagement device 32 starts (#22). That is, the hydraulic pressure command for the decoupling engagement device 32 is reduced stepwise from a full engagement pressure to a predetermined value greater than or equal to a direct-coupling limit engagement pressure (T21), and then is reduced at a constant time rate of change (T21 to T23). Note that, in parallel with the slip control of the decoupling engagement device 32, normal shift control is executed, so that the pre-phase Pp (T21 to T22) and the torque phase Pt (T22 to T23) proceed.

After the start of the slip control of the decoupling engagement device 32, when the start of the inertia phase Pi is determined (#23: Yes, T23), normal torque down control of the internal combustion engine EG is executed (#24) in the inertia phase Pi. In the inertia phase Pi, the rotational speed Neg of the input member 31 gradually decreases with a time rate of change less than the time rate of change of the rotational speed Nin of the shift input member 34. After the inertia phase Pi ends, monitoring is performed to determine whether the rotational speed Neg of the input member 31 is higher than or equal to the reference rotational speed Ns which is set to a value greater than the rotational speed Nin of the shift input member 34 (#25). In this control example, the reference rotational speed Ns is set to a rotational speed higher than the rotational speed Nin of the shift input member 34 by a second differential rotational speed ΔN2. Since the rotational speed Nin of the shift input member 34 after the end of the inertia phase Pi is the post-shift synchronous rotational speed Nsyna, the reference rotational speed Ns in this control example is set to the rotational speed higher than the post-shift synchronous rotational speed Nsyna by the second differential rotational speed ΔN2. The post-shift synchronous rotational speed Nsyna is determined in proportion to the rotational speed of the output member 36 after the end of the inertia phase Pi (more specifically, by multiplying by the speed ratio of the shift speed after shifting). The second differential rotational speed ΔN2 is determined in advance in view of a margin for accurately determining whether racing of the internal combustion engine EG is beginning to occur, and may be appropriately set in a range of, for example, 20 to 200 (rpm).

If the rotational speed Neg of the input member 31 is determined to be higher than or equal to the rotational speed higher than the post-shift synchronous rotational speed Nsyna by the second differential rotational speed ΔN2 (#25: Yes, T25), special torque down control of the internal combustion engine EG is executed (#26). In the present embodiment, in a second period P2 (T25 to T26) from a time point after the end of the inertia phase Pi to a time point before direct-coupling engagement of the decoupling engagement device 32, special torque down control of the internal combustion engine EG is executed. Note that the special torque down control of the internal combustion engine EG is different from the normal torque down control of the internal combustion engine EG (#24, T23 to T24) already executed in the inertia phase Pi. The special torque down control of the internal combustion engine EG is different from the normal torque down control of the internal combustion engine EG at least in the timing of execution. In the present embodiment, the special torque down control of the internal combustion engine EG is different from the normal torque down control of the internal combustion engine EG also in the amount of torque reduced. The amount of torque reduced in the special torque control is less than the amount of torque reduced in the normal torque down control.

In the present embodiment, by executing the special torque down control (torque down control after changing the rotational speed during a power-on upshift), it is possible to prevent a further increase in the rotational speed of the internal combustion engine EG after the end of the inertia phase Pi, even in the case where the decoupling engagement device 32 is caused to slip during a shift operation. Accordingly, it is possible to prevent the internal combustion engine EG from racing after the end of the inertia phase Pi, while reducing the shock at the end of shifting by causing the decoupling engagement device 32 to slip during a shift operation.

The rotational speed Neg of the input member 31 gradually decreases during execution of the special torque down control as well. In this case, the rotational speed Neg of the input member 31 may be reduced by executing rotational speed control of the decoupling engagement device 32 to make the actual rotational speed difference between paired engagement members of the decoupling engagement device 32 follow the target differential rotational speed that gradually decreases over time, for example. When the rotational speed Neg of the input member 31 gradually decreases and is synchronized with the post-shift synchronous rotational speed Nsyna (#27: Yes, T26), the special torque down control of the internal combustion engine EG ends (#28). Note that if the rotational speed Neg of the input member 31 is synchronized with post-shift synchronous rotational speed Nsyna without becoming higher than or equal to the rotational speed higher than the post-shift synchronous rotational speed Nsyna by the second differential rotational speed ΔN2 (#25: No, #27: Yes), the normal torque down control ends without executing special torque down control of the internal combustion engine EG Subsequently, the decoupling engagement device 32 is brought into the direct coupling state again (#29). Thus, the in-shift slip control ends.

Other Embodiments (1) In the above embodiment, an example has been described, as the first and second control examples, in which special torque down control is executed only before the start of or after the end of the inertia phase Pi during a power-on upshift. However, the present disclosure is not limited thereto. For example, special torque down control may be executed both before the start of and after the end of the inertia phase Pi during a power-on upshift by combining the first control example and the second control example.

(2) Each of the first differential rotational speed ΔN1 and the second differential rotational speed ΔN2 for determining the reference rotational speed Ns in the respective first control example and the second control example described in the above embodiment may have a constant value, or may vary in accordance with, for example, the shift speed. Furthermore, the first differential rotational speed ΔN1 and the second differential rotational speed ΔN2 may be equal to each other, or may be different from each other.

(3) In the above embodiment, an example has been described in which special torque down control is executed only in the first period P1 before the start of the inertia phase Pi or in the second period P2 after the end of the inertia phase Pi. However, the present disclosure is not limited thereto. For example, if a determination is made that the rotational speed Neg of the input member 31 is higher than or equal to the reference rotational speed Ns which is higher than the rotational speed Nin of the shift input member 34 by a predetermined determination differential rotational speed, during the inertia phase Pi, normal torque down control and special torque control may be executed together. However, this applies only to the case where the output torque of the internal combustion engine EG can be further reduced by executing special torque down control, in addition to normal torque down control.

(4) In the above embodiment, an example has been described in which the target shift speed is established when two of the plurality of shift engagement devices 35C are in the direct-coupling engaged state. However, the present disclosure is not limited thereto. For example, the target shift speed may be established when one or three or more shift engagement devices 35C are in the direct-coupling engaged state.

Figure 8:
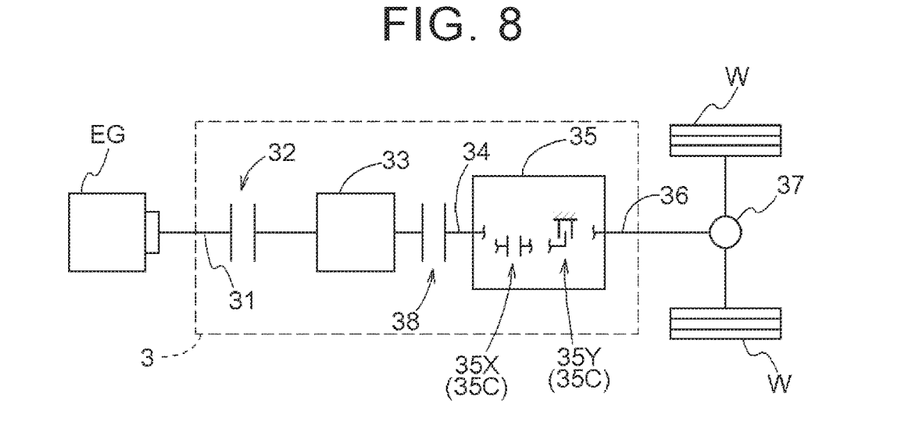
FIG. 8 is a schematic view illustrating a vehicle drive device according to another embodiment.

(5) In the above embodiment, an example has been described in which control is performed on the vehicle drive device 3 including only the decoupling engagement device 32 as an engagement device provided on the power transmission path connecting the internal combustion engine EG and the wheels W. However, the present disclosure is not limited thereto. For example, as illustrated in FIG. 8, in the vehicle drive device 3 that is controlled, a second decoupling engagement device 38 may be further provided on the power transmission path connecting the internal combustion engine EG and the transmission device 35. In this case, the "engagement device" that is caused to slip during a shift operation may be the decoupling engagement device 32, or may be the second decoupling engagement device 38.

(6) In the above embodiment, an example has been described in which control is performed on the vehicle drive device 3 including, as the transmission device 35, a type of stepped automatic transmission device that includes the planetary gear mechanism and the plurality of shift engagement devices 35C. However, the present disclosure is not limited thereto. In the vehicle drive device 3 that is controlled, for example, another type of stepped automatic transmission device such as a dual clutch transmission (DCT) may be used as the transmission device 35.

Figure 9:
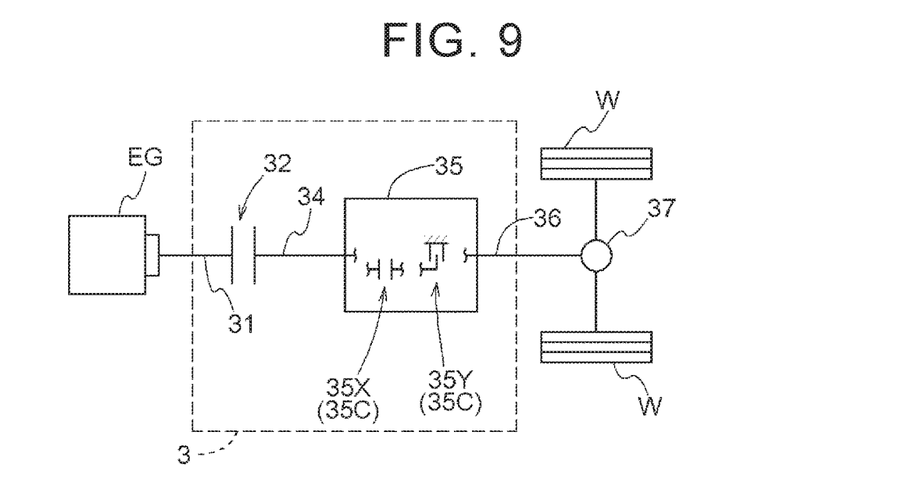
FIG. 9 is a schematic view illustrating a vehicle drive device according to another embodiment.

(7) In the above embodiment, an example has been described in which control is performed on the vehicle drive device 3 (hybrid vehicle drive device) including the decoupling engagement device 32, the rotary electric machine 33, and the transmission device 35, on the power transmission path connecting the internal combustion engine EG and the wheels W. However, the present disclosure is not limited thereto. For example, as illustrated in FIG. 9, the vehicle drive device 3 that is controlled may be a so-called internal combustion engine vehicle drive device that does not include the rotary electric machine 33 serving as a second driving force source.

Figure 10:
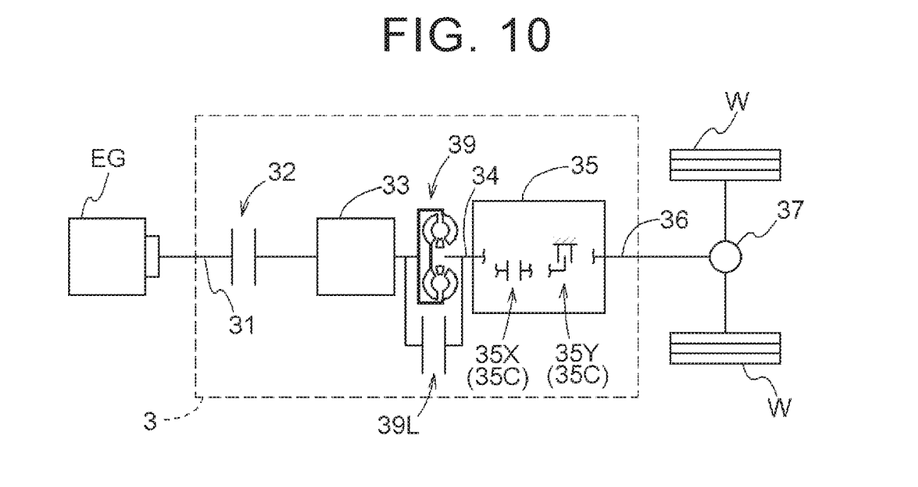
FIG. 10 is a schematic view illustrating a vehicle drive device according to a reference example.

Note that, as for a vehicle provided with a vehicle drive device 3 (see FIG. 10) in which a hydraulic coupling 39 (such as torque converter and fluid coupling) including a direct-coupling engagement device 39L and the transmission device 35 on the power transmission path connecting the internal combustion engine EG and the wheels W, racing of the internal combustion engine EG during a shift operation, which is a technical problem to be solved by the present disclosure, does not occur regardless of whether the rotary electric machine 33 is provided. This is because, in such a vehicle, although the direct-coupling engagement device 39L is sometimes caused to slip during a shift operation, the hydraulic coupling 39 serves as a weight for fluid connection.

The features disclosed in each of the above embodiments (including the embodiment and the other embodiments described above; the same applies in the following description) may be applied in combination with the features disclosed in the other embodiments as long as no inconsistency arises.

Regarding other features as well, it should be understood that the embodiments disclosed herein are merely examples in all respects. Accordingly, those skilled in the art may make various modifications without departing from the scope and spirit of the present disclosure.

Summary of Embodiments

To summarize the above, a control device according to the present disclosure is preferably configured as described below.

[1]

A control device (1) that controls a vehicle drive device (3) in which an input member (31), an engagement device (32, 38, 39L), a shift input member (34), a transmission device (35), and an output member (36) are disposed in this order on a power transmission path connecting an internal combustion engine (EG) and wheels (W), wherein in-shift slip control is executed that causes the engagement device (32, 38, 39L) to slip during a power-on upshift which performs switching to a shift speed with a relatively low speed ratio while torque in a forward acceleration direction is transferred to the wheels (W); inertia phase torque down control is executed that reduces output torque of the internal combustion engine (EG) during an inertia phase (Pi) in the power-on upshift; and when a determination is made that a rotational speed (Neg) of the input member (31) is higher than or equal to a reference rotational speed (Ns) which is set to a value greater than a rotational speed (Nin) of the shift input member (34) during execution of the in-shift slip control, special torque down control is executed that reduces the output torque of the internal combustion engine (EG) in a first period (P1) from a time point after start of slip of the engagement device (32, 38, 39L) to start of the inertia phase (Pi).

According to this configuration, even when the torque of the internal combustion engine for accelerating the wheels in the forward direction is transferred to the wheels in the inertia phase during a shift operation (power-on upshift), it is possible to make the shift operation progress appropriately, by executing inertia phase torque down control to reduce the rotational speed of the shift input member. Furthermore, during execution of control for causing the engagement device disposed between the internal combustion engine and the transmission device to slip, it is possible to detect that racing of the internal combustion engine is beginning to occur based on the magnitude relationship between the rotational speed of the input member and the reference rotational speed higher than the rotational speed of the shift input member. If it is detected that racing is beginning to occur, special torque down control is executed to reduce the output torque of the internal combustion engine, thereby preventing a further increase in the rotational speed of the internal combustion engine. Accordingly, it is possible to prevent the internal combustion engine from racing, even when performing control for causing the engagement device disposed between the internal combustion engine and the transmission device to slip during a shift operation. In particular, it is possible to prevent the internal combustion engine from racing before the start of the inertia phase, by performing special torque down control, separately from the inertia phase torque down control, in the first period before the start of the inertia phase in the power-on upshift.

[2]

The special torque down control is executed in a second period (P2) from a time point after end of the inertia phase (Pi) to a time point before direct-coupling engagement of the engagement device (32, 38, 39L)

According to this configuration, it is possible to prevent the internal combustion engine from racing even after the end of the inertia phase, by executing the special torque down control, separately from the inertia phase torque down control, in the second period after the end of the inertia phase.

The control device according to the present disclosure only needs to provide at least one of the above advantageous effects.

The invention claimed is:

1. A control device that controls a vehicle drive device in which an input member, an engagement device, a shift input member, a transmission device, and an output member are disposed in this order on a power transmission path connecting an internal combustion engine and wheels, the control device comprising:

an electronic control unit that is configured to:
execute in-shift slip control that causes the engagement device to slip during a power-on upshift which performs switching to a shift speed with a relatively low speed ratio while torque in a forward acceleration direction is transferred to the wheels;
execute inertia phase torque down control that reduces output torque of the internal combustion engine during an inertia phase in the power-on upshift; and
when a determination is made that a rotational speed of the input member is higher than or equal to a reference rotational speed which is set to a value greater than a rotational speed of the shift input member during execution of the in-shift slip control, execute special torque down control that reduces the output torque of the internal combustion engine in a first period from a time point after start of slip of the engagement device to start of the inertia phase.

2. The control device according to claim 1, wherein the electronic control unit executes the special torque down control in a second period from a time point after end of the inertia phase to a time point before direct-coupling engagement of the engagement device.

* * * * *